(12) United States Patent
Han et al.

(10) Patent No.: US 8,073,466 B2
(45) Date of Patent: Dec. 6, 2011

(54) METHOD AND SYSTEM FOR PROVIDING LOCATION MEASUREMENT OF NETWORK BASED TO MOBILE COMMUNICATION TERMINAL BY USING G-PCELL DATABASE

(75) Inventors: Gyuyoung Han, Gyeonggi-do (KR);
Sehyun Oh, Seoul (KR); Jongtae Ihm, Gyeonggi-do (KR); Seongho Ha, Gyeonggi-do (KR); Hojin Yang, Gyeonggi-do (KR); Jungbae Moon, Gyeonggi-do (KR); Chaehwan Cho, Seoul (KR); Kihak Shim, Seoul (KR)

(73) Assignee: SK Telecom Co., Ltd. (KR)

( * ) Notice: Subject to any disclaimer, the term of this patent is extended or adjusted under 35 U.S.C. 154(b) by 411 days.

(21) Appl. No.: 12/513,567

(22) PCT Filed: May 29, 2007

(86) PCT No.: PCT/KR2007/002604
§ 371 (c)(1),
(2), (4) Date: May 5, 2009

(87) PCT Pub. No.: WO2008/056864
PCT Pub. Date: May 15, 2008

(65) Prior Publication Data
US 2010/0062792 A1    Mar. 11, 2010

(30) Foreign Application Priority Data

Nov. 7, 2006  (KR) .......................... 10-2006-0109252

(51) Int. Cl.
*H04W 24/00* (2009.01)
*G01S 19/00* (2010.01)
(52) U.S. Cl. ................. 455/456.2; 455/456.1; 342/357.2
(58) Field of Classification Search ............... 455/404.2, 455/456.2, 456.1, 456.3, 436; 370/335, 350, 370/342, 252; 342/457, 357.4, 357.42, 357.25, 342/357.22
See application file for complete search history.

(56) References Cited

U.S. PATENT DOCUMENTS

| | | | | |
|---|---|---|---|---|
| 7,714,779 | B2* | 5/2010 | Abraham ................ | 342/357.31 |
| 7,822,425 | B2* | 10/2010 | Shim et al. ................ | 455/456.1 |
| 7,974,639 | B2* | 7/2011 | Burroughs et al. ........ | 455/456.2 |

* cited by examiner

*Primary Examiner* — Kiet Doan
(74) *Attorney, Agent, or Firm* — Baker & Hostetler LLP

(57) ABSTRACT

Disclosed are a method and a system for providing a mobile communication terminal with network-based location measurement by using a G-pCell database. The method and system are advantageous in that, when a mobile communication system employs a network-based location measurement scheme, the influence of repeaters is reduced to improve the positioning stability and measurement accuracy and provide more stable location-based services.

28 Claims, 7 Drawing Sheets

METHOD AND SYSTEM FOR PROVIDING LOCATION MEASUREMENT OF NETWORK BASED TO MOBILE COMMUNICATION TERMINAL BY USING G-PCELL DATABASE

TECHNICAL FIELD

The present invention relates to a method and a system for providing a mobile communication terminal with network-based location measurement by using a G-pCell database. More particularly, the present invention relates to a method and a system for providing a mobile communication terminal with network-based location measurement by using a G-pCell database, wherein the service region, in which the network-based location measurement is to be provided, is divided into lattices of a predetermined size, each lattice is defined as a G-pCell and is endowed with a G-pCell ID having proper information, location measurement data collected by the mobile communication terminal is matched with the database table of each G-pCell ID to construct a G-pCell database, the G-pCell database is searched through when a location measurement request signal is received from the mobile communication terminal, and the latitude and longitude data of a G-pCell ID having the best pattern matching is selected from the G-pCell data base based on measurement data from the mobile communication terminal and is transmitted as a result of location measurement.

BACKGROUND ART

Various types of wireless communication services using mobile communication terminals are being developed in line with the remarkable development of electronic and communication technologies. Conventional services include wireless voice communication services providing mobile communication terminal users with wireless voice communication regardless of time and space, and text message services supplementing the voice communication services.

Wireless Internet services have recently commenced, which provide mobile communication service subscribers with Internet communication services via wireless communication networks, in line with the developing wireless Internet, and various technologies are being developed in connection with the wireless Internet.

Among various wireless Internet services using mobile communication terminals, the LBS (Location-Based Service) is recently drawing much attention due to the wide range of usefulness and convenience. The LBS refers to a communication service for positioning a mobile communication terminal and providing additional information based on the positioning result. The LBS is used in various fields and circumstances, including emergency aid requests, responses to crime reports, GIS (Geographical Information System) for providing information regarding adjacent regions, differentiation of mobile communication fees based on location, traffic information, vehicle navigation, circulation control, location-based CRM (Customer Relationship Management), etc.

Location measurement schemes for providing mobile communication terminals with the LBS include network-based schemes relying on the propagation environment (i.e. cell radius of a base station in a mobile communication network) to measure the location of mobile communication terminals and confirm the location on a software basis, handset-based schemes using GPS (Global Positioning System) receivers mounted in mobile communication terminals, and hybrid schemes combining both schemes.

The A-GPS scheme is one of the handset-based schemes, and is compatible with both European GSM (Global System for Mobile Communication)-based networks using the TDMA (Time Division Multiple Access) wireless access scheme and IS-95-based networks using the CDMA (Code Division Multiple Access) wireless access scheme. According to the GSM wireless scheme, mobile communication terminals are positioned by transmitting/receiving messages through an OMA SUPL (Secure User Plane Location) interface between the mobile communication terminals incorporating GPS receivers and the SPC (SUPL Positioning Center) within the GSM network and through an SUPL POS for A-GPS location measurement within the OMA SUPL (i.e. GSM A-PGS protocol incorporating an RRLP (Radio Resource Location Protocol)). This type of positioning is very accurate because satellite signals are received from at least four GPS satellites to measure the location. The A-GPS system includes an SPC for receiving satellite signals received by mobile communication terminals and calculating the location, and an SLC (SUPL Location Center) for processing the calculation based on information regarding base stations within the GSM mobile communication network or associating the information with other systems.

The E-OTD (Enhanced Observed Time Difference) scheme is a representative network-based location measurement scheme, and has been standardized through LCS Release 98 and 99 by the GSM standardization committee of the European TDMA-based GSM scheme using the TDMA wireless access standard. According to the E-OTD, signals received from at least three base stations by a mobile communication terminal are used to calculate the difference in time of arrival and distance and determine the location. In other words, the E-OTD scheme combines various time difference concepts, including OTD (Observed Time Difference), RTD (Relative Time Difference), GTD (Geometric Time Difference), etc. for network-type location calculation.

The OTD refers to the difference in time spent by signals from two base stations to reach a mobile communication terminal, and can be obtained by measuring the UE Rx-Tx time difference type 2 parameter by a GSM-based mobile communication terminal.

The RTD refers to a parameter used to obtain the difference in starting time of signals transmitted by two base stations, and can only be measured by equipping the base stations with a separate measuring device, i.e. LMU (Location Measurement Unit). This means that, in order to obtain the key parameter necessary for network-type location calculation recommended by the GSM standard, i.e. "GTD=OTD-RTD", not only the OTD, but also the RTD must be obtained for the E-OTD-type network location calculation.

According to network-based location measurement technology, data (PPM, OTD, RTD, etc.) measured by a mobile communication terminal and an LMU is transmitted to a location measurement server according to a protocol (IS-801, RRLP, RRC, etc.) agreed upon between the mobile communication terminal and the server, and the data (PPM, OTD, RTD, etc.) measured by the mobile communication terminal is used by the location measurement server to measure the location of the corresponding mobile communication terminal. The location measurement server conducts network-type location measurement (i.e. the server side measures the location of the terminal that has requested location measurement, location measurement schemes using GPS satellites being excluded), and transmits the result to the requesting party (SLC, CP (Contents Provider), mobile communication terminal that has requested the service, etc).

The network-based location measurement technology includes a cell ID scheme using the base station radius cell, an AOA (Angle of Arrival) scheme according to which the base station receives signals from a mobile communication terminal and calculates the LOB (Line of Bearing) to calculate the location, a TOM (Time of Arrival) scheme according to which the location of a mobile communication terminal is calculated based on the time of arrival of radio waves from at least three base stations, and a TDOA (Time Difference of Arrival) scheme according to which the difference in time of arrival of pilot signals received by a mobile communication terminal from three base stations is measured to calculate the difference in distance between the base stations so that the point of intersection of two resulting hyperbolas is determined as the location of the mobile communication terminal.

However, the above-mentioned conventional network-based location measurement schemes have the following problems.

Firstly, when data regarding parameters (i.e. time and distance) measured by a mobile communication terminal or the mobile communication network is used for triangulation or to calculate the point of intersection of hyperbolas, repeaters heavily affect the result. This means that, if repeaters are used, data measured by a mobile communication terminal regarding the time and distance between the base station and the mobile communication terminal is delayed relative to the original data. This degrades the location measurement accuracy.

Secondly, in the case of triangulation using time and distance measurement parameters in an asynchronous mobile communication network (GSM or W-CDMA), not only the OTD measured by a mobile communication terminal, but also the RTD value measured by an additional LMU equipped with separate GPS equipment must be measured to obtain the location measurement result from the formula. Considering that it has little merit per investment to additionally install LMUs in the entire mobile communication network for the network-type location measurement, triangulation-based network location measurement cannot be used in a region having no LMU installed therein.

Thirdly, when a base station is rearranged, the latitude and longitude data of the rearranged base station is not instantly reflected. This means that there is no confirming whether or not the latitude and longitude data referred to for location measurement is identical to the latitude and longitude data of the rearranged base station.

Fourthly, since each network-based location measurement technology has different characteristics regarding the mobile communication base stations and sectors, excessive human and material resources are used to optimize parameters, which are differently used by base stations or sectors, for the purpose of improving the location measurement accuracy. This slows down the commercialization.

DISCLOSURE

Technical Problem

Therefore, the present invention has been made in view of the above-mentioned problems, and the present invention provides a method and a system for providing a mobile communication terminal with network-based location measurement by using a G-pCell database, wherein the service region, in which the network-based location measurement is to be provided, is divided into lattices of a predetermined size, each lattice is defined as a G-pCell and is endowed with a G-pCell ID having proper information, location measurement data collected by the mobile communication terminal is matched with the database table of each G-pCell ID to construct a G-pCell database, the G-pCell database is searched through when a location measurement request signal is received from the mobile communication terminal, and the latitude and longitude data of a G-pCell ID having the best pattern matching is selected from the G-pCell data base based on measurement data from the mobile communication terminal and is transmitted as a result of location measurement.

Technical Solution

In accordance with an aspect of the present invention, there is provided a method for providing a mobile communication terminal with network-based location measurement by using a G-pCell database, the method including the steps of (a) receiving a location measurement request signal from the mobile communication terminal by an SUPL positioning center; (b) extracting a primary G-pCell candidate group from the G-pCell database by using measurement data contained in the location measurement request signal received from the mobile communication terminal; (c) extracting a secondary G-pCell candidate group from the primary G-pCell candidate group by excluding G-pCell IDs from the primary G-pCell candidate group, the G-pCell IDs having a distance equal to or larger than a predetermined value relative to location of the mobile communication terminal; (d) selecting a G-pCell ID having best pattern matching with the measurement data from the secondary G-pCell candidate group; and (e) transmitting a latitude and a longitude of the G-pCell ID selected in step (d) to the mobile communication terminal.

According to another aspect of the present invention, there is provided a method for constructing a G-pCell database for providing a mobile communication terminal with network-based location measurement, the method including the steps of: (a) dividing a location measurement service target region into lattices of a predetermined size by an network positioning server, defining each lattice as a G-pCell, and assigning a G-pCell ID having proper information; (b) receiving a log file created by an SUPL positioning center as a result of positioning a mobile communication terminal with a reference satellite receiving device self-constructed in the SUPL positioning center, the mobile communication terminal having requested location measurement; (c) conducting program parsing for extracting only parameters necessary to update the G-pCell database to create separate data; and (d) comparing a latitude and a longitude corresponding to data regarding a positioning result for each LBS (Location Based Service) call from the separate data file with a latitude and longitude range of the G-pCell ID to find a G-pCell ID belonging to a nearest range, composing a database table based on measurement data collected by the mobile communication terminal at time of the LBS call with regard to the G-pCell ID found, and storing the database table.

According to another aspect of the present invention, there is provided a method for updating a G-pCell database for providing a mobile communication terminal with network-based location measurement, the method including the steps of (a) receiving a log file from an SUPL positioning center by a network positioning server; (b) parsing the log file to create separate data and searching for a G-pCell ID matching with the created separate data; (c) confirming whether or not an MCC, an MNC, an LAC, and a CI stored in a database table of each G-pCell ID with an MCC, an MNC, an LAC, and a CI contained in the separate data; (d) comparing a CI, the CI being an ID of a base station currently used by the mobile communication terminal, and a BSIC of an adjacent base station collected by the mobile communication terminal with every CI and every BSIC stored in a database table of a corresponding G-pCell ID when it has been confirmed in step (c) that the MCC, MNC, LAC, and CI stored in the database table of the G-pCell are identical to the MCC, MNC, LAC, and CI contained in the separate data, calculating an average of OTD and signal intensity values of the separate data with regard to matching CI and BSIC, and updating the database table of an existing G-pCell ID; and (d) adding a BSIC missing from a database table of the corresponding G-pCell ID to the database table of the G-pCell ID when it has been confirmed in step (c) that the MCC, MNC, LAC, and CI stored in the database table of the G-pCell ID are identical to the MCC, MNC, LAC, and CI contained in the separate data but the BSIC missing from a BSIC list of the database table of the corresponding G-pCell ID exists only in the separate data, storing OTD and signal intensity regarding the added BSIC, and updating the database table. According to another aspect of the present invention, there is provided a method for reflecting base station change information in a G-pCell database for providing a mobile communication terminal with network-based location measurement, the method including the steps of (a) receiving base station change information created in a mobile communication network from a central management system by a network positioning server; (b) searching through the base station change information to confirm whether or not the base station change information is base station deletion information; (c) searching for all G-pCell IDs constructed in the G-pCell database with reference to a corresponding base station and deleting all information constructed with reference to the corresponding base station from group information stored in the G-pCell IDs when it has been confirmed in step (b) that the base station change information is base station deletion information; (d) confirming whether or not the base station change information is base station addition information when it has been confirmed in step (b) that the base station change information is not base station deletion information; and (e) requesting that an SUPL positioning center provides a log file regarding a result of A-GPS positioning for a period of time set by an administrator or for a period of time after a point of time set by the administrator with regard to an added base station and constructing a database table of G-pCell IDs when it has been confirmed in step (d) that the base station change information is base station addition information.

According to another aspect of the present invention, there is provided a system for providing a mobile communication terminal with network-based location measurement by using a G-pCell database, the system including a SUPL positioning center acting as a network element for providing an A-GPS (Assisted GPS) service in a user plane type defined by SUPL (Secure User Plane Location) standards corresponding to OMA (Open Mobile Alliance) standards, the SUPL positioning center simultaneously providing a network-based solution service by using an A-GPS fallback solution even in an indoor region, an underground region, or other non-open regions having no available A-GPS service, the SUPL positioning center creating a separate log file for each A-GPS positioning from measurement data collected by the mobile communication terminal for network-type location measurement; a network positioning server for storing the G-pCell database, requesting data necessary for positioning by using a protocol defined separately from SUPL POS data in case of interworking with the SUPL positioning center, parsing the log file when the log file is received from the SUPL positioning center to extract measurement data transmitted to the SUPL positioning center by the mobile communication terminal, and searching through the G-pCell database based on the measurement data to select a G-pCell ID having best pattern matching from G-pCell IDs; a base station controller for controlling each base station arranged cell by cell and adapted to receive a location measurement request signal transmitted by the mobile communication terminal via a traffic channel among signal channels, the base station controller receiving the location measurement request signal from the base station; an SGSN (Serving GPRS Support Node) having a hardware structure adapted to provide ATM-based switch and routing access for a GPRS (General Packet Radio Service), the SGSN supporting an OS (Operating System) for various data service processing, the SGSN receiving the location measurement request signal from the base station controller; and a GGSN (Gateway GPRS Support Node) acting as a serving node in an IP-based packet network providing a high-speed packet data service for a data service, the GGSN transmitting the location measurement request signal to the SUPL positioning center via a WAP gateway when the location measurement request signal is received from the SGSN.

Advantageous Effects

The present invention is advantageous in that, when a mobile communication system employs a network-based location measurement scheme, the influence of repeaters is reduced to improve the positioning stability and measurement accuracy and provide more stable location-based services. In addition, GSM-based mobile communication terminals are provided with location-based serviced in a network positioning type without installing separate LMUs in the base stations.

DESCRIPTION OF DRAWINGS

The foregoing and other objects, features, and advantages of the present invention will become more apparent from the following detailed description when taken in conjunction with the accompanying drawings in which.

BEST MODE

Figure 1:
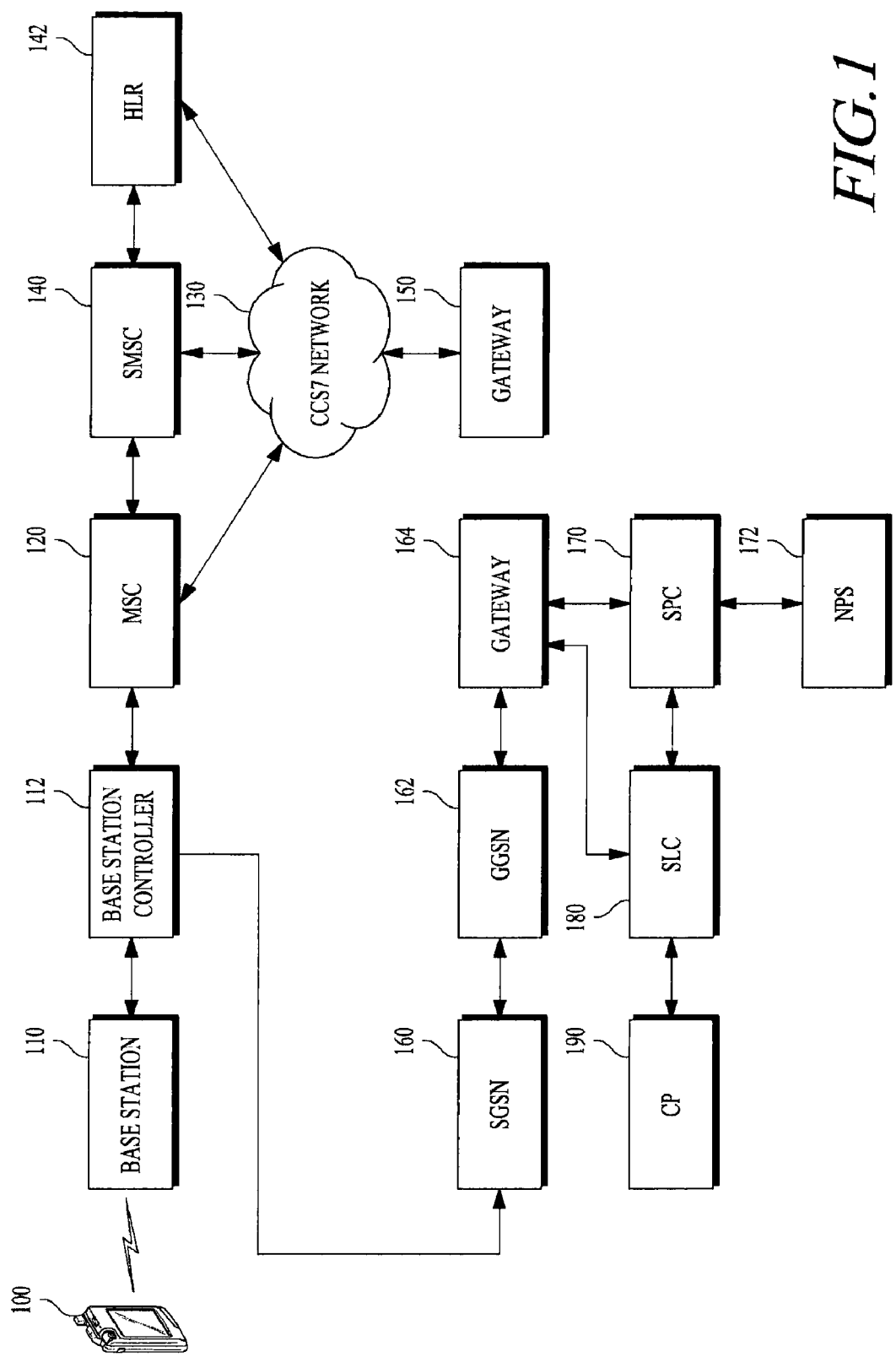
FIG. 1 briefly shows a system for providing a mobile communication terminal with network-based location measurement by using a G-pCell database according to a preferred embodiment of the present invention.

Hereinafter, preferred embodiments of the present invention will be described in detail with reference to the accompanying drawings. It is to be noted that the same reference numerals are used to designate the same elements throughout the specification. In addition, detailed descriptions of known functions and configurations incorporated herein is omitted to avoid making the subject matter of the present invention unclear.

Mode for Invention

FIG. 1 briefly shows a system for providing a mobile communication terminal with network-based location measurement by using a G-pCell database according to a preferred embodiment of the present invention.

The system for providing a mobile communication terminal with network-based location measurement by using a G-pCell database according to a preferred embodiment of the present invention includes a mobile communication terminal 100, a base station 110, a base station controller 112, an MSC (Mobile Switching Center) 120, a CCS7 network 130, an SMSC (Short Message Service Center) 140, a home location register 142, a gateway 150, an SGSN (Serving GPRS Support Node) 160, a GGSN (Gateway GPRS Support Node) 162, a WAP gateway 164, an SPC (SUPL Positioning Center) 170, an NPS (Network Positioning Server) 172, an SLC (SUPL Location Center) 180, and a CP (Contents Provider) 190.

The mobile communication terminal 100 according to a preferred embodiment of the present invention is adapted to collect measurement data necessary for the network-type location measurement and transmits the data to the SPC 170. If the SPC does not interwork, the collected measurement data is transmitted to the NPS 172.

The measurement data collected by the mobile communication terminal 100 for the network-type location measurement according to the present invention includes information regarding the system currently providing a service, information regarding the identity adjacent base stations, OTD values, signal intensity (Ec/Io), etc. The information regarding the system currently providing a service includes the MCC (Mobile Country Code) of the GSM service region, an MNC (Mobile Network Code) for recognizing the business provider in the GSM network service region, an LAC (Location Area Code) which is a code indicating the coverage of a GSM base station, CI (Cell Identity) which is the only information used to identify base station information, a BSIC (Base station Identity Code) which is the ID of an adjacent base station, an ARFCN (Absolute Radio Frequency Channel Number) which is an RF channel ID number of the GSM, etc. The measurement also includes TA (Timing Advance) which means a round trip delay measured by a base station used by a mobile communication terminal 100 and provided to the mobile communication terminal 100, the delay being measured from the base station 110 to the mobile communication terminal 100, an RSSI (Received Signal Strength Indicator) corresponding to the intensity of all signals received by the base station 110 which the mobile communication terminal 100 is currently using, RXLEV which indicates the intensity of signals received by the mobile communication terminal 100, an RXQUAL parameter indicating the degree of the received signal intensity, BSIC which is an ID number of each adjacent base station, the OTD value of each adjacent base station, which corresponds to the difference in received signals between the base station used by the mobile communication terminal 100 and an adjacent base station, an RXLEV value which is a parameter indicating the signal intensity of each adjacent base station, etc.

Each base station 110 is arranged cell by cell and is adapted to receive a signal requesting packet data communication from the mobile communication terminal 100 via a traffic channel among signal channels and to conduct location registration, i.e. position the mobile communication terminal 100 existing in the cell region managed by the base station 110.

The base station controller 112 controls the base station 110 and interworks with the MSC 120 to allocate wireless channels to the mobile communication terminal 100 or release the channels. In addition, the base station controller 112 controls the transmission power of the mobile communication terminal 100 and the base station 110, determines the inter-cell soft handoff and hard handoff, conducts transcoding and vocoding, distributes GPS clocks, administrates, maintains and repairs the base station, etc. Although the base station controller 112 is conventionally installed in the MSC 120, it will be assumed for convenience of description that the base station controller 112 is separate from the MSC 120.

The SMSC 140 provides an SMS (Short Message Service) which enables the mobile communication terminal to exchange short messages containing numerals, characters, etc. with various character transmission systems (not shown) in both directions via a mobile communication network, as well as an MMS (Multimedia Message Service) for transmitting multimedia messages (photos, images, moving pictures, etc.) besides simple texts or voice messages.

The home location register 142 is a database storing service profiles regarding subscriber information of mobile communication terminal users. The subscriber information includes the telephone number of the subscriber, the MIN (Mobile Identification Number) of the mobile communication terminal, the ESN (Electronic Serial Number) of the terminal, the service type, and information regarding the base station 110 and the MSC 120 corresponding to the location of the mobile communication terminal 100.

The MSC 120, the SMSC 140, and the home location register 142 transmit/receive signals with one another via the CCS7 network 130.

The gateway 150 is adapted to convert communication codes or protocols between the mobile communication network and the wired Internet so that information can be quickly searched through the wired Internet and displayed. Particularly, the gateway 150 connects the mobile communication network 110 with other communication networks, including a PSTN (Public Switched Telephone Network), a PSDN (Public Switched Data Network), an ISDN (Integrated Services Digital Network), a B-ISDN (Broad ISDN), an IN (Intelligent Network), a PLMN (Public Land Mobile Network), etc.

The SGSN 160 has a hardware structure suited to provide an ATM-based switch and routing access for a GPRS (General Packet Radio Service), and supports an OS (Operating system) necessary to process various data services. The OS incorporates a GPRS mobility management function, a GPRS session management function, a GPRS authentication and accounting function, etc.

The SGSN 160 according to the present invention is adapted to receive a location measurement request signal, which is transmitted by the mobile communication terminal 100 via the base station 110, and forwards the signal to the SPC 170 or the NPS 172.

The GGSN 162 is a serving node of an IP-based packet network which provides a high-speed packet data service for a data service, and is adapted to provide mobility of the packet data service and process various data-related protocols. Particularly, the GGSN 162 incorporates functions for address allocation, domain address modification, accounting, maintenance, and repair.

When the mobile communication terminal 100 provided with a WAP browser transmits a location measurement request signal to the SPC 170 or the NPS 172, the signal is transmitted via the WAP gateway 164 by using the mobile communication network. The WAP gateway 164 receives a request for an Internet service from the mobile communication terminal 100 according to the WAP, converts the request based on the PCT/IP (Transmission Control Protocol/Internet Protocol), and transmits the converted request to the SPC 170 or the NPS 172. Furthermore, the WAP gateway 164 receives response data from the SPC 170 or the NPS 172 according to the TCP/IP, converts the data according to WAP, and transmits the converted data to the mobile communication terminal 100.

The SPC 170 according to a preferred embodiment of the present invention is a network element for providing an A-GPS (Assisted GPS) service in a user plane scheme defined by the SUPL (Secure User Plane Location) specification, which follows the OMA (Open Mobile Alliance) standard. The SPC 170 can simultaneously provide a network-based solution service (G-pCell solution) by using an A-GPS fallback solution, which provides much better location measurement accuracy than in the case of using the cell ID in a region where the A-GPS service is unavailable (e.g. indoor, underground, or any other region that is not open). In order to automatically construct a G-pCell database, the SPC 170 interworks with the NPS 172, creates a separate log file for each A-GPS location measurement from measurement data, which has been collected by the mobile communication terminal 100 for the network-type location measurement, and periodically transmits the log file to the NPS 172. Alternatively, the SPC 170 creates a log file at each request of the administrator and transmits it to the NPS 172. As such, the SPC 170 provides an interworking function necessary to automatically construct a G-pCell database.

According to the present invention, for the sake of the interworking between the mobile communication terminal 100 and the SPC 170, a protocol (IS-801 for CDMA-based mobile communication terminals, RRLP for GSM-based mobile communication terminals, and RRC for W-CDMA-based mobile communication terminals) is matched so that A-GPS location measurement can be conducted by using the mobile communication network as the connection path. In order to construct a G-pCell database, the SPC 170 or the NPS 172 requests that the mobile communication terminal 100 collects measurement data for network-based location measurement according to a separately defined protocol, which is conducted in the TCP/IP mode. In this mode, the mobile communication terminal 100 interworks with the SPC 170 or the NPS 172 via the base station 110 of the GSM mobile communication network, the base station controller 112, the SGSN 160, and the GGSN 162 according to the TCP/IP.

The NPS 172 according to a preferred embodiment of the present invention stores an already constructed G-pCell database. When interworking with the SPC 170, the NPS 172 requests data necessary for location measurement according to a protocol defined separately from SUPL POS data, extracts location-related measurement data which has been sent to the SPC by the mobile communication terminal, and updates the G-pCell database based on the extracted measurement data.

The SLC 180 is a server for processing result data transmitted as a location measurement result by the SPC 170 and the NPS 172. The SLC 180 interworks with a data network via the WAP gateway 164 and transmits the location measurement result to the mobile communication terminal 100 in an HTTP type.

Although it has been assumed that, when the SPC 170 receives a location measurement request signal from the mobile communication terminal 100, it searches through the G-pCell database stored in the NPS 172 and transmits the latitude and longitude of a G-pCell ID having the best matching to the SLC 180, which then forwards the latitude and longitude to the mobile communication terminal 100 as a location measurement result, the SPC 170 can transmit the location measurement result directly to the mobile communication terminal 100. Alternatively, the NPS 172 may receive a location measurement request signal directly from the mobile communication terminal 100 and transmit a location measurement result to the mobile communication terminal 100.

The CP 190 refers to a business provider's server for providing the mobile communication terminal 100 with contents based on location measurement.

Figure 2:
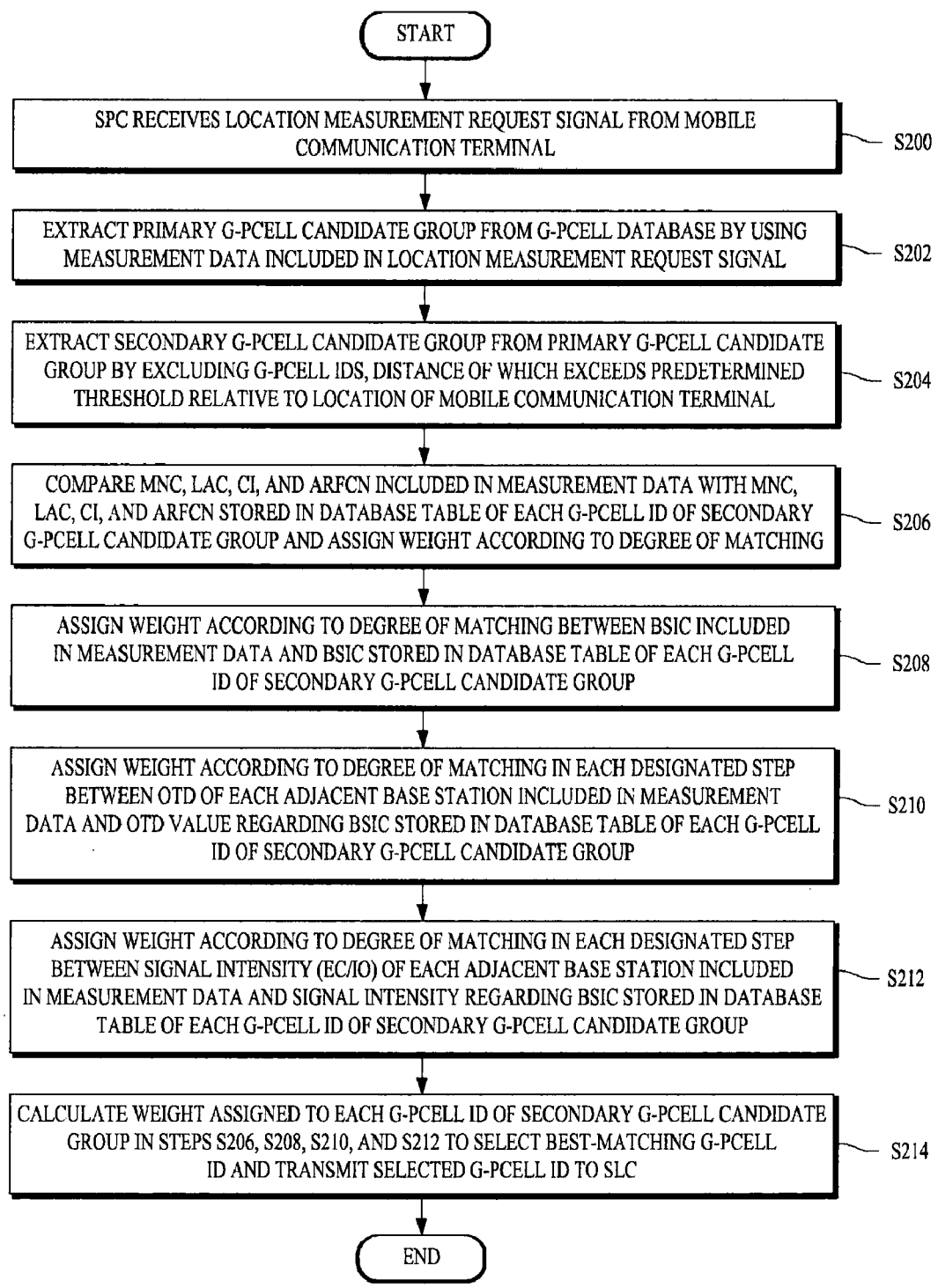
FIG. 2 is a flowchart showing processes for providing a mobile communication terminal with network-based location measurement by using a G-pCell database according to a preferred embodiment of the present invention.

FIG. 2 is a flowchart showing processes for providing a mobile communication terminal with network-based location measurement by using a G-pCell database according to a preferred embodiment of the present invention.

For location measurement, the mobile communication terminal 100 transmits a location measurement request signal to the SPC 170 via the mobile communication network (S200).

In order to provide the mobile communication terminal with network-based location measurement by using a G-pCell database according to a preferred embodiment of the present invention, the NPS 172 must have a G-pCell database constructed and stored therein. The processes for constructing a G-pCell database will be described later with reference to FIG. 3.

The location measurement request signal transmitted to the SPC 170 by the mobile communication terminal 100 according to the present invention includes measurement data collected by the mobile communication terminal 100 to use the network-based location measurement, such as information regarding the system currently providing a service, signals regarding the time and distance of adjacent base stations, and signal intensity (Ec/Io).

After receiving the location measurement request signal from the mobile communication terminal 100, the SPC 170 interworks with the mobile communication terminal 100 by using a location measurement protocol, and measurement data included in the location measurement request signal received from the mobile communication terminal 100 is used to extract a primary G-pCell candidate group (S202).

The location measurement protocol for the interworking between the SPC 170 and the mobile communication terminal 100 according to the present invention is IS-801 when the mobile communication terminal is based on CDMA, RRLP when based on GSM, and RRC when based on W-CDMA.

Based on the data of MCC, MNC, LAC, CI, and BSIC of the measurement data included in the location measurement request signal received from the mobile communication terminal 100, the SPC 170 selects G-pCell IDs matching with the MCC, MNC, LAC, CI, and BSIC of the measurement data from the entire G-pCell database stored in the NPS 172 as the primary G-pCell candidate group.

The SPC 170 extracts a secondary G-pCell candidate group from the primary G-pCell candidate group by excluding G-pCell IDs, the distance of which is equal to or larger than a predetermined value relative to the location of the mobile communication terminal 100, from the primary G-pCell candidate group (S204).

This means that, in step S204, G-pCell IDs spaced excessively relative to the actual location of the mobile communication terminal 100 are excluded by finding G-pCell IDs, the distance from the center point of the cells exceeds a predetermined threshold, of the primary G-pCell candidate group and excluding them from the primary G-pCell candidate group. It is also possible to apply different thresholds for respective cell sizes.

Alternatively, the average distance from the center point of the cells is calculated for the primary G-pCell candidate, and G-pCell IDs are excluded from the primary G-pCell candidate if their distance exceeds the average distance. Furthermore, based on TA (Timing Advance) corresponding to the distance from the center of the base station 110 currently used by the mobile communication terminal 100 to the mobile communication terminal 100 that has requested location measurement, G-pCell IDs lying out of the range of TA−1~TA+1 may be excluded.

The SPC 170 compares the MNC (Mobile Network Code) for recognizing the business provider in the service region, the LAC (Location Area Code) which is a code indicating the coverage of the GSM base station, the CI (Cell Identity) which is the only information used to identify base station information, and the ARFCN (Absolute Radio Frequency Channel Number) which is a channel number used to identify the designated RF channel of the GSM wireless system (all of which are included in the measurement data transmitted by the mobile communication terminal 100) with the MNC, LAC, CI, and ARFCN stored in the database table of each G-pCell ID of the secondary G-pCell candidate group, and assigns weights according to the degree of matching (S206).

The SPC 170 assigns weights according to the degree of matching between the BSIC, which is the ID of an adjacent base station and which is included in the measurement data, with the BSIC stored in the database table of each G-pCell ID of the secondary G-pCell candidate group (S208).

The SPC 170 assigns weights according to the degree of matching in each designated step between the OTD of each adjacent base station included in the measurement data transmitted by the mobile communication terminal 100 and the OTD value regarding the BSIC stored in the database table of each G-pCell ID of the secondary G-pCell candidate group (S210).

The SPC 170 assigns weights according to the degree of matching in each designated step between the signal intensity (Ec/Io) of each adjacent base station included in the measurement data transmitted by the mobile communication terminal 100 and the signal intensity regarding the BSIC stored in the database table of each G-pCell ID of the secondary G-pCell candidate group (S212).

The weights assigned to respective G-pCell IDs of the secondary G-pCell candidate group in steps S206, S208, S210, and S212 are calculated to select the best-matching G-pCell ID and transmit the selected G-pCell ID to the SLC 180 (S214).

Although it has been assumed that all of the four standards included in the measurement data received from the mobile communication terminal 100 are applied to assign weights based on the degree of matching in steps S206 to S212, the present invention is not limited to that, and those skilled in the art can combine at least two of the standards for assigning weights according to the requirement regarding accuracy.

In addition, although the mobile communication terminal 100 has been assumed to request a location service, the CP 190 may request the location service if necessary.

If the primary G-pCell candidate group fails to be extracted from the measurement data in step S202, the mobile communication terminal 100 is provided with location measurement according to a first method including the steps of drawing connection lines between every BSIC based on information regarding the TA related to the location of the mobile communication terminal 100 and every BSIC measured by the mobile communication terminal 100, as well as the latitude and longitude data for each BSIC which corresponds to BSA (Base Station Almanac) information stored in the NPS 172, drawing circles of TA+1 and TA−1 based on the latitude and longitude of the base station currently used by the mobile communication terminal 100, finding the intersection points, and transmitting the center point of the intersection points to the mobile communication terminal 100 as the location measurement result, a second method including the steps of obtaining the center point of a cell in which the mobile communication terminal 100 that has requested location measurement is located, as well as the center point of two adjacent cells, finding the center point of the three vertices, and transmitting the center point to the mobile communication terminal 100 as the location measurement result, or a third method of selecting one of both methods with better location accuracy and transmitting it to the mobile communication terminal 100.

Figure 3:
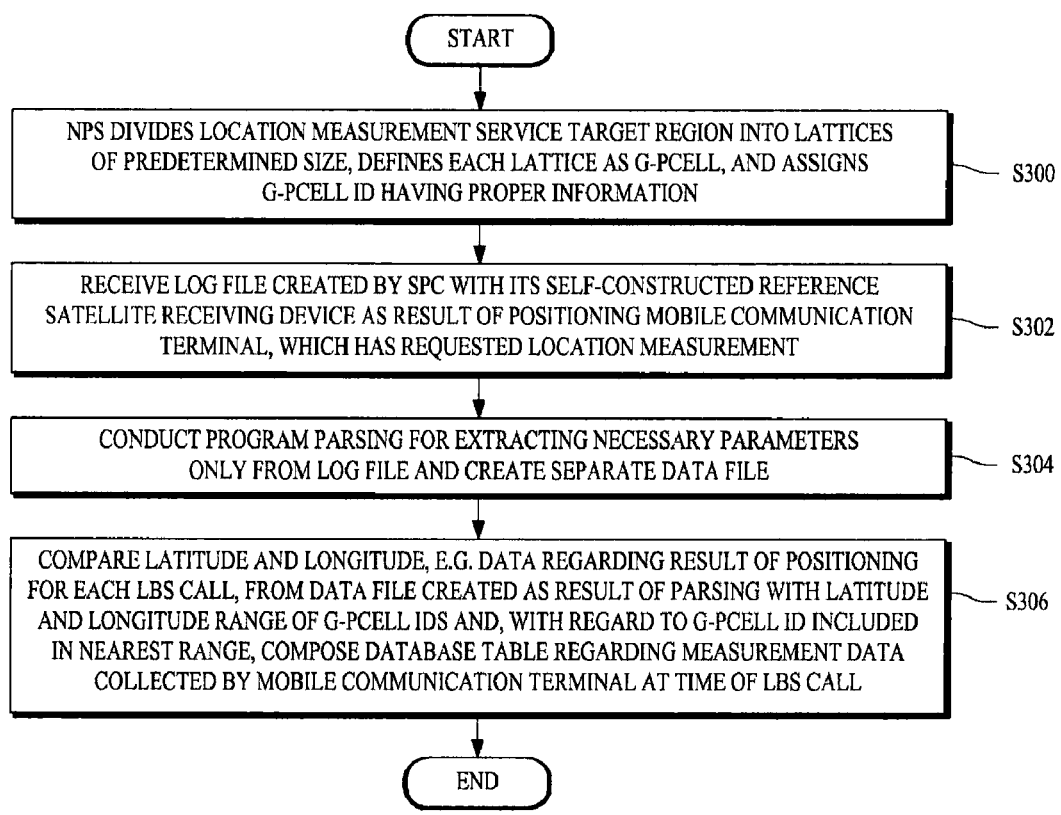
FIG. 3 is a flowchart showing processes for constructing a G-pCell database according to a preferred embodiment of the present invention.

FIG. 3 is a flowchart showing processes for constructing a G-pCell database according to a preferred embodiment of the present invention.

In order to construct a G-pCell database according to a preferred embodiment of the present invention, the NPS 172 divides the location measurement service target region into lattices of a predetermined size, defines each lattice as a G-pCell, and assigns a G-pCell ID having proper information (S300).

The proper information of the G-pCell ID given to each lattice according to the present invention refers to data regarding the latitude and longitude of the center point of each lattice, as well as the latitude and longitude of four vertices of the lattice. The lattice size may vary depending on the required measurement accuracy, but the target region is preferably divided into squares of 100 m×100 m, 50 m×50 m, etc.

The SPC 170 uses its self-constructed reference satellite receiving device to position the mobile communication terminal 100, which has requested location measurement, and create a log file, which is received by the NPS 172 (S302).

The satellite positioning data to be matched with each G-pCell ID is obtained in the following manner: when a commercially available satellite positioning data is used, satellite calls with good positioning accuracy are solely selected based on RF characteristic data, which is received by the SPC 170 from the mobile communication terminal 100 for each call positioning of the LBS (Location Based Service), to create a log file. It is also possible to select the result of satellite positioning, which is related to a region requested by a person or which has been simultaneously requested by a number of persons, to create a log file. Alternatively, data with a good positioning result is solely selected from commercially available network-type positioning results to create a log file. It is assumed in the description of the present invention that a log file is created based on satellite positioning data collected from the satellite receiving device.

The SPC 170 separately selects satellite positioning data, which provides an adequate degree of positioning accuracy, from the received satellite positioning data. In the case of A-GPS positioning, the adequate level of positioning accuracy is defined in such manner that at least a predetermined number (e.g. five) of satellites are selected to obtain satellite positioning data, which is supposed to satisfy a required level of uncertainty as a standard for determining the positioning accuracy. In the case of network-type positioning, the positioning accuracy refers to the result of positioning when there are at least a predetermined number (e.g. four) of adjacent cells during the positioning and when every employed cell has no repeater.

Upon receiving a log file from the SPC 170, the NPS 172 conducts program parsing for extracting necessary parameters only and creates a separate data file (S304).

The latitude and longitude, e.g. data regarding the result of positioning for each LBS call, from the data file created as a result parsing in step S304, are compared with the latitude and longitude range of G-pCell IDs, and, with regard to a G-pCell ID included in the nearest range, a database table is composed regarding measurement data collected by the mobile communication terminal 100 at the time of the LBS call (S306).

A G-pCell database is constructed by composing the database table for every G-pCell ID.

The database table matching with G-pCell IDs according to the present invention includes system information measured by the mobile communication terminal 100 and measurement data regarding the time and distance of adjacent base stations.

Basic data must be collected for the mobile communication terminal 100 to make use of a location-based service. Measurement data basically collected by the mobile communication terminal 100 corresponds to information regarding the system currently providing a service, including the MCC (Mobile Country Code) of the GSM service region, an MNC (Mobile Network Code) for recognizing the business provider in the GSM network service region, an LAC (Location Area Code) which is a code indicating the coverage of a GSM base station, CI (Cell Identity) which is the only information used to identify base station information, a BSIC (Base station Identity Code) which is the ID of an adjacent base station, an ARFCN (Absolute Radio Frequency Channel Number) which is an RF channel ID number of the GSM, TA (Timing Advance) which means a round trip delay measured by a base station used by a mobile communication terminal 100 and provided to the mobile communication terminal 100, the delay being measured from the base station 110 to the mobile communication terminal 100, an RSSI (Received Signal Strength Indicator) corresponding to the intensity of all signals received by the base station 110 which the mobile communication terminal 100 is currently using, RXLEV which indicates the intensity of signals received by the mobile communication terminal 100, an RXQUAL parameter indicating the degree of the received signal intensity, BSIC which is an ID number of each adjacent base station, the OTD value of each adjacent base station, which corresponds to the difference in received signals between the base station used by the mobile communication terminal 100 and an adjacent base station, and an RXLEV value which is a parameter indicating the signal intensity of each adjacent base station.

Figure 4:
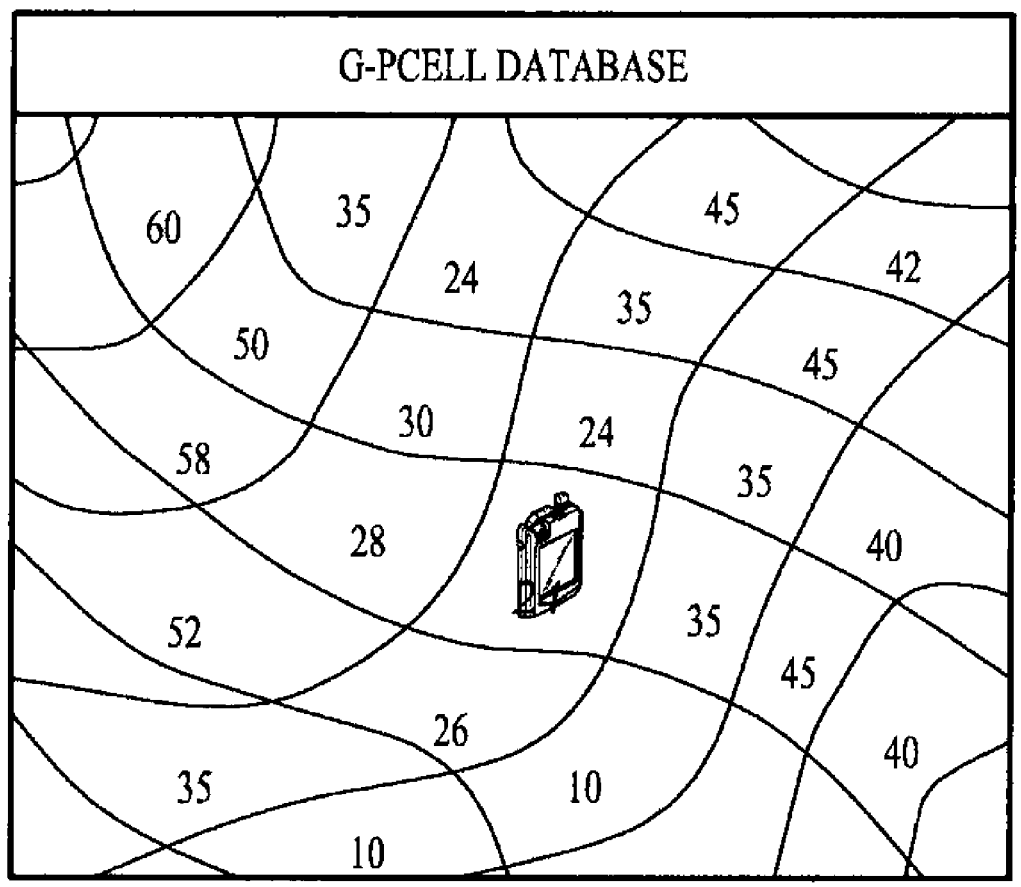
FIG. 4 shows a G-pCell database constructed according to a preferred embodiment of the present invention.

FIG. 4 shows a G-pCell database constructed according to a preferred embodiment of the present invention.

As mentioned above, the NPS 172 endows each G-pCell of a predetermined size with a proper G-pCell ID. However, after a G-pCell database is constructed, data stored in the database table of each G-pCell ID is compared to endow the same or similar G-pCell IDs with the same number so that a G-pCell ID group is established. For example, if data stored in the database table of the first G-pCell ID and data stored in the database table of the second G-pCell ID have the same data, except for the OTD value for each adjacent base station, which means the difference in received signals between adjacent base stations, the same number is given to construct a G-pCell ID group as shown in FIG. 3.

Figure 5:
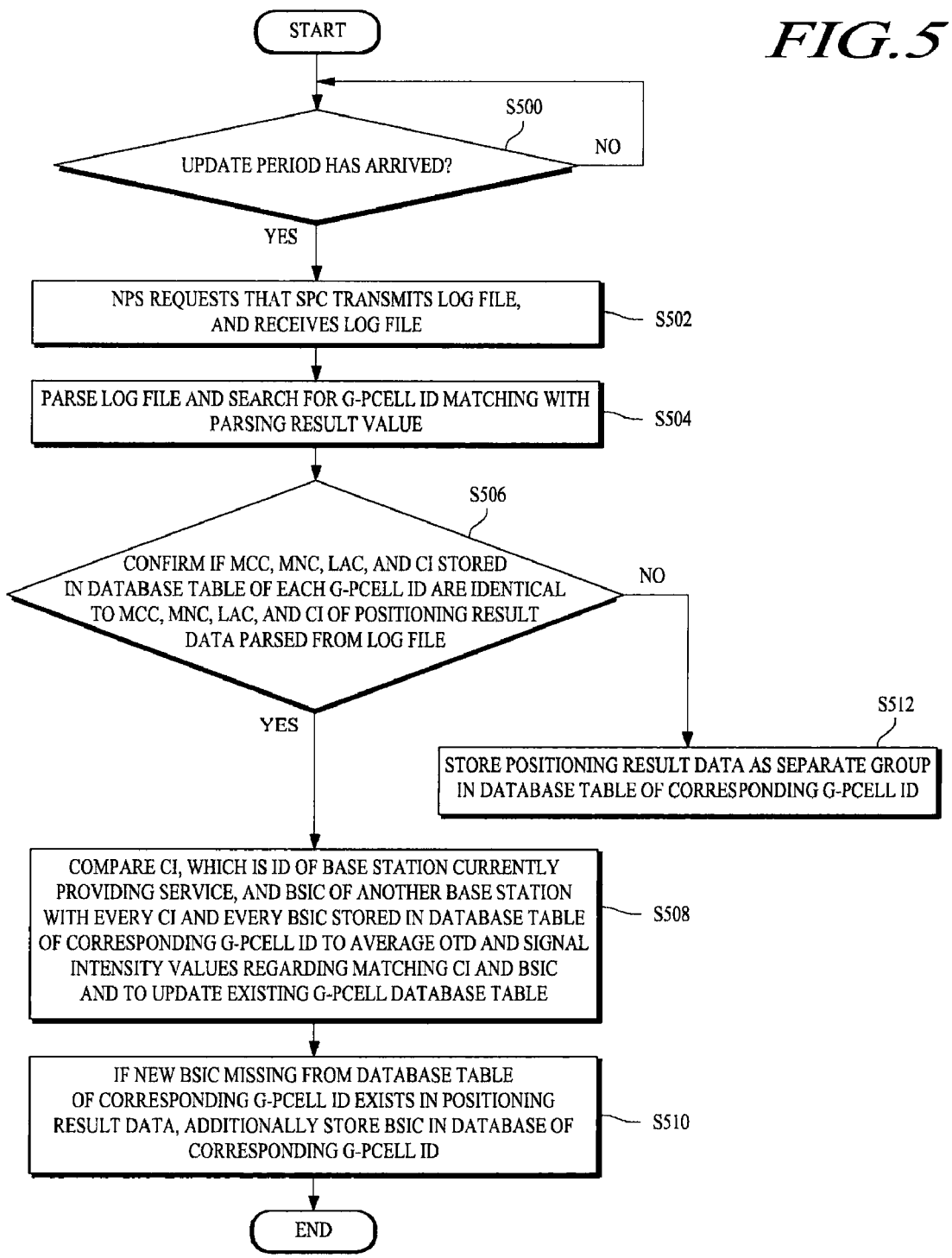
FIG. 5 is a flowchart showing processes for updating a G-pCell database according to a preferred embodiment of the present invention.

FIG. 5 is a flowchart showing processes for updating a G-pCell database according to a preferred embodiment of the present invention.

It is to be noted that, even after a database is initially constructed with regard to each G-pCell ID according to a preferred embodiment of the present invention, the G-pCell database must be continuously updated according to the situation change of the mobile communication network and the log file created by the SPC 170.

The update process is conducted either at an update cycle set by the administrator of the network-type positioning system, as shown in FIG. 1, or every time the administrator requests it. It will be assumed in the description of the present invention that the update is conducted at a cycle set by the administrator. The NPS 172 manages its own update cycle and checks if an update period has arrived (S500).

If it is confirmed in step S500 that an update period has arrived, the NPS 172 requests that the SPC 170 transmits a log file, and receives the log file (S502). Considering that the G-pCell database is continuously updated at the update cycle according to the present invention, the SPC 170 continuously creates and stores a log file from the A-GPS positioning result from the commercial service subscriber. The SPC 170 transmits the log file to the NPS 172 at the request of the NPS 172.

After receiving the log file from the SPC 170, the NPS 172 parses the log file and searches for a G-pCell ID matching with the parsing result value (S504).

Although it is assumed in the present invention that a log file regarding the result of commercially available A-GPS positioning is parsed to update the G-pCell database by the NPS 172, it is also possible to update the G-pCell database based on manual A-GPS positioning result if the A-GPS service is not available in the corresponding region.

The MCC, MNC, LAC, and CI stored in the database table of each G-pCell are compared with the MC, MNC, LAC, and CI of the positioning result data parsed form the log file to confirm whether or not they are identical (S506).

If it is confirmed in step S506 that the MCC, MNC, LAC, and CI stored in the database table of the G-pCell ID are identical to the MCC, MNC, LAC, and CI of the positioning result data parsed from the log file, the CI of a base station, which is currently providing the mobile communication terminal 100 with a service, and the BSIC of another base station are compared with the CI stored in the database table of the corresponding G-pCell and every BSIC to average the OTD and signal intensity values with regard to the matching CI and BSIC and to update them (S508). The OTD and signal intensity values are used as materials to assign a weight to each G-pCell belonging to the above-mentioned secondary G-pCell candidate group.

If a plurality of OTD and signal intensity values regarding the matching BSIC exist in the database table of the G-pCell ID, all OTD and signal intensity values are averaged to update reference data when the OTD or signal intensity values are below a predetermined number (e.g. six). If the values are equal to or larger than the predetermined number, values belonging to a reference range are averaged (i.e. values lying out of upper and lower 20% ranges are excluded, and the remaining values are averaged) to update the reference data.

Assuming that the four parameters MCC, MNC, LAC, and CI are the same and that a BSIC missing from the BSIC list of the database table of the corresponding G-pCell exists only in the positioning result data, the missing BSIC is added to the G-pCell ID database list. Then, the OTD and the signal intensity regarding the added BSIC are stored to update the database table (S510).

If it is confirmed in step S506 that at least one of the MCC, MNC, LAC, and CI stored in the database table of the G-pCell ID does not match with the corresponding MCC, MNC, LAC, and CI of the positioning result data parsed from the log file, the NPS 172 stores the positioning result data as a separate group in the database table of the corresponding G-pCell ID (S512). As such, even the handoff situation that is likely to occur in the corresponding G-pCell is considered in step S512 to construct a database table and improve the integrity of the database.

In other words, conventional network positioning schemes do not manage data in detail by considering the handoff situation of the mobile communication terminal 100. As a result, the rate of matching with various types of positioning data occurring in the same region decreases, and the positioning accuracy degrades. The present invention solves these problems by introducing the above-mentioned grouping system, and improves the integrity of the database.

Figure 6:
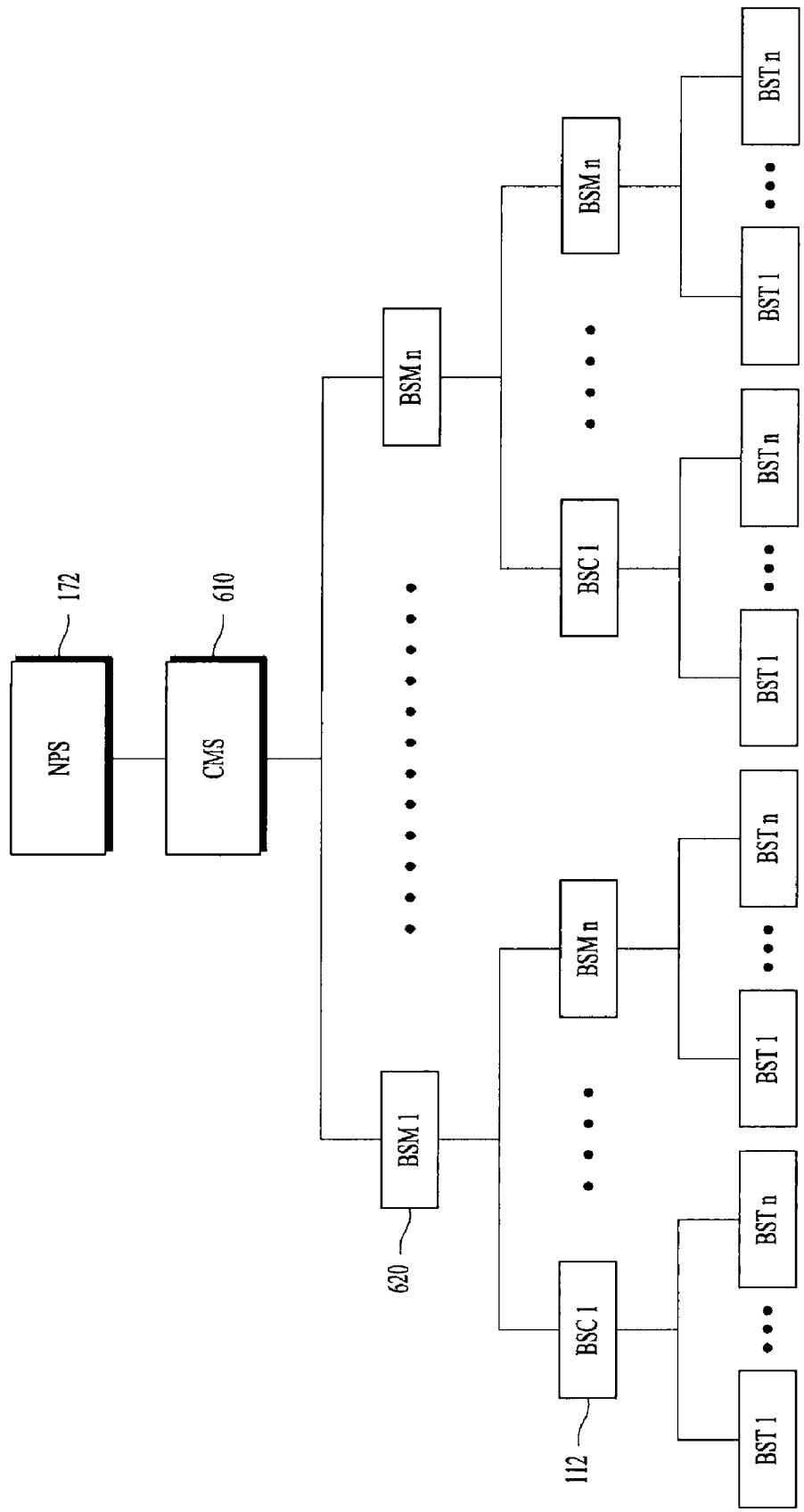
FIG. 6 briefly shows a system for reflecting the particulars of change of a base station in a G-pCell database according to a preferred embodiment of the present invention.

FIG. 6 briefly shows a system for reflecting the particulars of change of a base station in a G-pCell database according to a preferred embodiment of the present invention.

According to the present invention, the particulars of change of the base station 110 in the mobile communication network can be reflected in the G-pCell database to optimize it. Any change of the base station 110 is the result of cell planning by the business provider of the mobile communication network, and includes addition, replacement, and deletion of a base station, addition of an exchanger within a base station due to increasing subscribers, modification of name of an exchanger in a specific base station, etc. In order to maintain an optimum database, any change of the base station 110 must be followed by corresponding modification of the database table of the G-pCell ID which belongs to the changed base station. The present invention guarantees that, when the base station changes, the G-pCell database changes in response while interworking with the BSM provided by the business provider of the mobile communication network.

A CMS (Central Management System) 610 for reflecting the particulars of change of the base station in the G-pCell database according to a preferred embodiment of the present invention interworks with the base station controller 112 contained in the MSC 120 shown in FIG. 1 and with a BSM (Base Station Manager) 620 for managing the base station 110 to manage information regarding all base stations and base station controllers contained in the BSM 620.

Particularly, each base station controller 112 manages five base stations 110 and collects information regarding them, each BSM 620 manages five base station controllers 112 and collects information regarding them, and the CMS 610 finally manages five BSMs 620. As such, the CMS 610 collects information regarding changes of base stations from information transmitted from lower elements in the tree structure, and reflects the information in the G-pCell database.

The NPS 172 periodically checks the CMS 610 to confirm whether or not the base station information has changed so that information regarding change of the base station, which occurs depending on the situation of the mobile communication subscriber, is reflected in the G-pCell database. If it is confirmed that the base station information has changed, information regarding the changed base station is received to reflect it in the G-pCell database.

Although it is assumed in the description of the present invention that the NPS 172 periodically checks the CMS 610 to confirm whether or not the base station information has changed, the administrator may arbitrarily check if the base station information has changed and reflect the changed base station information, if any, in the G-pCell database. Alternatively, if the base station information has changed, the CMS 610 transmits the changed base station information directly to the NPS 172 so that the changed base station information is reflected in the G-pCell database.

Figure 7:
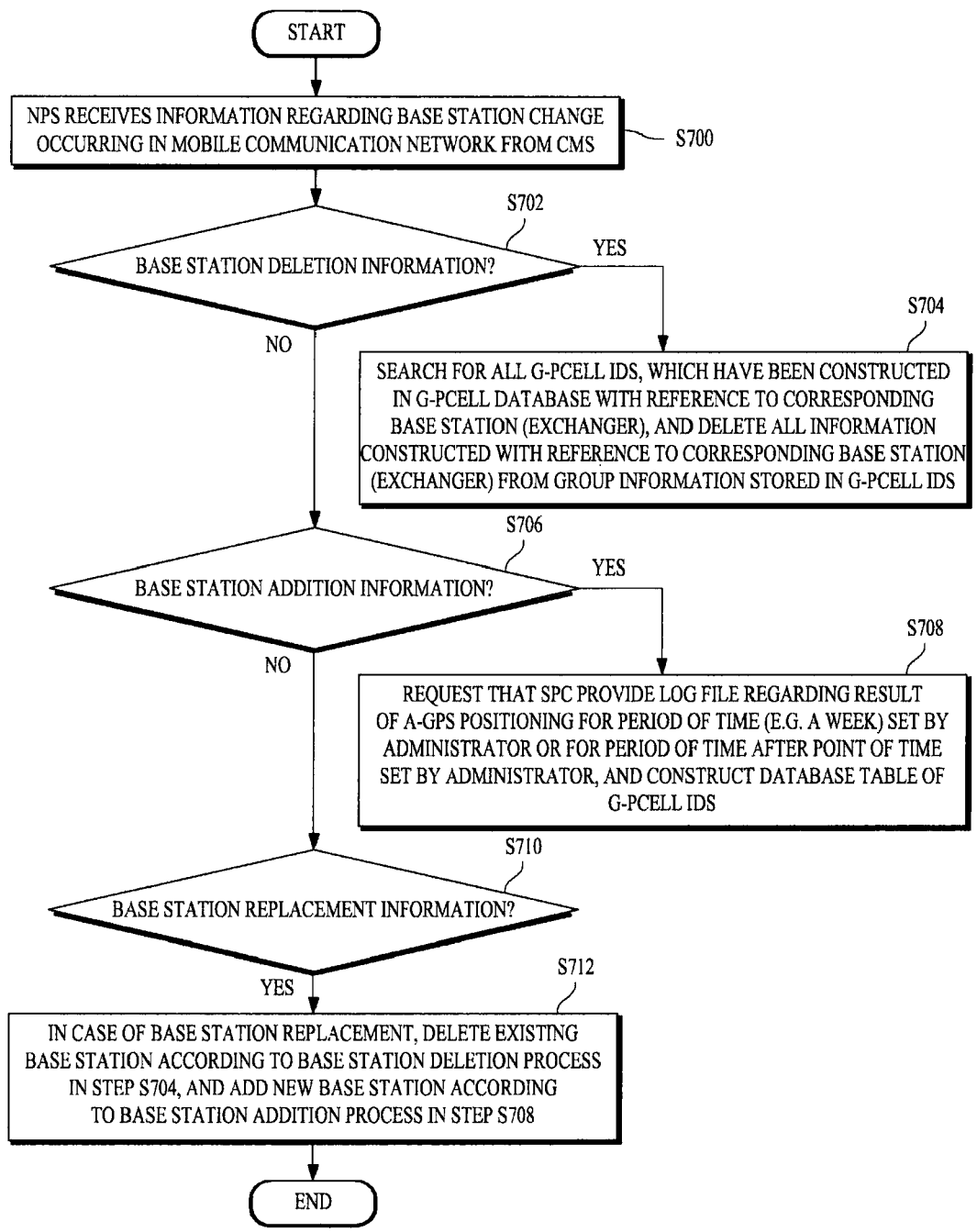
FIG. 7 is a flowchart showing processes for reflecting the particulars of change of a base station in a G-pCell database according to a preferred embodiment of the present invention.

FIG. 7 is a flowchart showing processes for reflecting the particulars of change of a base station in a G-pCell database according to a preferred embodiment of the present invention.

The NPS 172 receives information regarding a base station change that has occurred in the mobile communication network from the CMS 610 (S700).

The administrator of the NPS 712 may receive the information regarding a base station change from the CMS 610 at a point of time set by the administrator. Alternatively, the information may be transmitted by the CMS 610 in real time every time a base station change occurs. It is assumed in the description of the present invention that the CMS 610 transmits information regarding a base station change to the NPS 172 in real time every time the change occurs.

The NPS 172 searches through the received information and confirms whether or not the information is related to deletion of a base station (S702).

If it is confirmed in step S702 that the received information is related to deletion of a base station (including deletion of an exchanger), the NPS 172 searches for all G-pCell IDs, which have been constructed with reference to the corresponding base station (exchanger) in the G-pCell database, and deletes all information constructed with reference to the corresponding base station (exchanger) from group information stored in the G-pCell IDs (S704).

If it is confirmed in step 702 that the received information is not related to deletion of a base station (including deletion of an exchanger), the NPS 172 searches through the received information to confirm whether or not the information is related to addition of a base station (S706).

If it is confirmed in step S706 that the received information is related to addition of a base station (including addition of an exchanger), the NPS 172 requests that the SPC 170 provide a log file regarding the result of A-GPS positioning for a period of time (e.g. a week) set by the administrator or for a period of time after a point of time set by the administrator, and constructs a database table of G-pCell IDs (S708). The G-pCell database is then updated in the above-mentioned manner.

If it is confirmed in step S706 that the received information is not related to addition of a base station (including addition of an exchanger), the NPS 172 searches through the received information and confirms whether or not the information is related to replacement of an exchanger (S710).

If it is confirmed in step S710 that the received information is related to replacement of a base station (including replacement of an exchanger), the corresponding base station is deleted, and a new base station is added at the same time. Particularly, the existing base station is deleted according to the base station deletion process in step S704, and a new base station is added according to the base station addition process in step S708.

As such, according to the present invention, data is continuously updated based on the result of A-GPS positioning, and particulars of change of a base station is directly reflected, so that the optimum database is always maintained.

Although preferred embodiments of the present invention have been described with reference to GSM as a mobile communication system to which the inventive network-based positioning method using a G-pCell database is applied, the present invention is not limited to that. Those skilled in the art can understand that the inventive positioning method for providing a location-based service can also be applied to W-CDMA, WiBro, etc., besides GSM. As used herein, WiBro refers to wireless broadband portable Internet to be commercialized soon, which aims at enabling subscribers to use ultra-high speed Internet on the move.

The above-mentioned network-based positioning method using a G-pCell database according to the present invention can be implemented as computer-readable codes implemented on computer-readable recording media. As used herein, the computer-readable recording media include every type of recording devices capable of storing programs or data that can be read by computer systems. Examples of computer-readable recording media include ROMs, RAMs, CD-ROMs, magnetic tapes, hard disks, floppy disks, flash memories, optical data storage devices, etc. As used herein, programs stored in recording media refer to a series of instructions used directly or indirectly in devices capable of processing information (e.g. computers) to obtain specific results. Therefore, contrary to commonly accepted usages, "computers" must be interpreted as every type of devices capable of processing information, which are equipped with memories, input/output devices, and processing devices so that specific functions can be conducted according to programs.

The above-mentioned network-based positioning method using a G-pCell database according to the present invention may be written on computers by schematic or VHDL and implemented by a programmable IC, such as FPGA (Field Programmable Gate Array), connected to computers. The recording media include such programmable ICs.

The recording media also include an ASIC (Application Specific Integrated Circuit) obtained by implementing the network-based positioning method as a platform by ICs in an LBS system.

Although several exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

As mentioned above, the present invention is advantageous in that, when a mobile communication system employs a network-based location measurement scheme, the influence of repeaters is reduced to improve the positioning stability and measurement accuracy and provide more stable location-based services. In addition, GSM-based mobile communication terminals are provided with location-based serviced in a network positioning type without installing separate LMUs in the base stations.

The invention claimed is:

1. A method for providing a mobile communication terminal with network-based location measurement by using a G-pCell database, the method comprising the steps of:
    (a) receiving a location measurement request signal from the mobile communication terminal by an SUPL (Secure User Plane Location) positioning center;
    (b) extracting a primary G-pCell candidate group from the G-pCell database by using measurement data contained in the location measurement request signal received from the mobile communication terminal;
    (c) extracting a secondary G-pCell candidate group from the primary G-pCell candidate group by excluding G-pCell IDs from the primary G-pCell candidate group, the G-pCell IDs having a distance equal to or larger than a predetermined value relative to location of the mobile communication terminal;
    (d) selecting a G-pCell ID having best pattern matching with the measurement data from the secondary G-pCell candidate group; and
    (e) transmitting a latitude and a longitude of the G-pCell ID selected in step (d) to the mobile communication terminal.

2. The method as claimed in claim 1, wherein step (b) comprises the steps of:
    (b1) searching through the location measurement request signal received from the mobile communication terminal to extract the measurement data;
    (b2) extracting an MCC (Mobile Country Code), an MNC (Mobile Network Code), an LAC (Location Area Code), a CI (Cell Identity), and a BSIC (Base Station Identity Code) from the measurement data, the MCC being a country code of a GSM service region, the MNC being a network code for identifying a business provider of a GSM network service region, the LAC being a code indicating a coverage of a GSM base station, the CI being only information used to recognize base station information, the BSIC being information for identifying an adjacent base station; and
    (b3) selecting G-pCell IDs from the G-pCell database as the primary G-pCell candidate group, all of the MCC, MNC, LAC, CI, and BSIC extracted from the measurement data matching with the G-pCell IDs.

3. The method as claimed in claim 1, wherein, in step (c), the secondary G-pCell candidate group is extracted by excluding G-pCell IDs from the primary G-pCell candidate group, degree of spacing of the G-pCell IDs from center points of cells exceeding a predetermined threshold.

4. The method as claimed in claim 1, wherein, in step (c), the secondary G-pCell candidate group is extracted by excluding G-pCell IDs from the primary G-pCell candidate group, degree of spacing of the G-pCell IDs from center points of cells exceeding an average distance from the center points of the cells of the primary G-pCell candidate group.

5. The method as claimed in claim 3, wherein, in step (c), the secondary G-pCell candidate group is extracted by selecting only G-pCell IDs existing within a predetermined TA (Timing Advance) radius by using TA information, the TA information being a parameter indicating a distance from a center point of a base station currently used by the mobile communication terminal to the mobile communication terminal.

6. The method as claimed in claim 3, wherein, in step (c), the secondary G-pCell candidate group is extracted by selecting only G-pCell IDs existing in a range of TA−1~TA+1 by using TA information, the TA information being a parameter indicating a distance from a center point of a center cell of the primary G-pCell candidate group to the mobile communication terminal.

7. The method as claimed in claim 4, wherein, in step (c), the secondary G-pCell candidate group is extracted by selecting only G-pCell IDs existing within a predetermined TA (Timing Advance) radius by using TA information, the TA information being a parameter indicating a distance from a center point of a base station currently used by the mobile communication terminal to the mobile communication terminal.

8. The method as claimed in claim 4, wherein, in step (c), the secondary G-pCell candidate group is extracted by selecting only G-pCell IDs existing in a range of TA−1~TA+1 by using TA information, the TA information being a parameter indicating a distance from a center point of a center cell of the primary G-pCell candidate group to the mobile communication terminal.

9. The method as claimed in claim 1, wherein, in step (d), a G-Cell ID having best pattern matching is selected from G-pCell IDs belonging to the secondary G-pCell candidate group according to at least one method of:

comparing at least one of an MNC (Mobile Network Code), an LAC (Location Area Code), a CI (Cell Identity), and an ARFCN (Absolute Radio Frequency Channel Number) contained in the measurement data with an MNC, an LAC, a CI, and an ARFCN stored in a database table of each G-pCell ID belonging to the secondary G-pCell ID to assign a weight based on degree of matching, the MNC being a network code for identifying a business provider of a GSM network service region, the LAC being a code indicating a coverage of a GSM base station, the CI being only information used to recognize base station information, the ARFCN being a channel number used to identify a designated RF channel of a GSM wireless system;

comparing a BSIC (Base Station Identity Code) contained in the measurement data with a database table of each G-pCell ID belonging to the secondary G-pCell candidate group to assign a weight based on degree of matching, the BSIC being adjacent base station identification information;

assigning a weight according to a degree of matching in each designated step between an OTD of each adjacent base station contained in the measurement data and an OTD value regarding a BSIC stored in a database table of each G-pCell ID of the secondary G-pCell candidate group; and assigning a weight according to a degree of matching in each designated step between signal intensity (Ec/Io) of each adjacent base station contained in the measurement data and signal intensity regarding a BSIC stored in a database table of each G-pCell ID of the secondary G-pCell candidate group.

10. The method as claimed in claim 1, further comprising, after step (a), a step of:

drawing connection lines between every BSIC based on information regarding a TA related to location of the mobile communication terminal and every BSIC measured by the mobile communication terminal, as well as based on latitude and longitude data for each BSIC, the data corresponding to BSA (Base Station Almanac) information stored in a network positioning server, drawing circles of TA+1 and TA−1 based on a latitude and a longitude of a base station currently used by the mobile communication terminal, finding intersection points, and transmitting a center point of the intersection points to the mobile communication terminal as a location measurement result, when the primary G-pCell candidate group cannot be extracted by using the measurement data.

11. The method as claimed in claim 1, wherein the measurement data is basically collected by the mobile communication terminal to use the LBS and comprises, as information regarding a system currently providing a service, an MCC (Mobile Country Code) of a GSM service region, an MNC (Mobile Network Code) for recognizing a business provider in a GSM network service region, an LAC (Location Area Code) as a code indicating coverage of a GSM base station, CI (Cell Identity) as only information used to identify base station information, a BSIC (Base station Identity Code) as an ID of an adjacent base station, an ARFCN (Absolute Radio Frequency Channel Number) as an RF channel identification number of GSM, a TA (Timing Advance) meaning a round trip delay measured from a base station to the mobile communication terminal, an RSSI (Received Signal Strength Indicator) corresponding to intensity of all signals received by the base station currently used by the mobile communication terminal, an RXLEV indicating intensity of signals received by the mobile communication terminal, an RXQUAL parameter indicating degree of the received signal intensity, an OTD value of each adjacent base station as a difference in received signals between the base station currently used by the mobile communication terminal and an adjacent base station, and an RXLEV value as a parameter indicating signal intensity of each adjacent base station.

12. A method for constructing a G-pCell database for providing a mobile communication terminal with network-based location measurement, the method comprising the steps of:

(a) dividing a location measurement service target region into lattices of a predetermined size by an network positioning server, defining each lattice as a G-pCell, and assigning a G-pCell ID having proper information;

(b) receiving a log file created by an SUPL (Secure User Plane Location) positioning center as a result of positioning a mobile communication terminal with a reference satellite receiving device self-constructed in the SUPL positioning center, the mobile communication terminal having requested location measurement;

(c) conducting program parsing for extracting only parameters necessary to update the G-pCell database to create separate data; and (d) comparing a latitude and a longitude corresponding to data regarding a positioning result for each LBS (Location Based Service) call from the separate data file with a latitude and longitude range of the G-pCell ID to find a G-pCell ID belonging to a nearest range, composing a database table based on measurement data collected by the mobile communication terminal at time of the LBS call with regard to the G-pCell ID found, and storing the database table.

13. The method as claimed in claim 12, wherein the G-pCell ID comprises latitude and longitude data corresponding to a center point of the lattices of a predetermined size, and latitude and longitude data regarding four vertices of the lattices.

14. The method as claimed in claim 12, wherein the log file is created by selecting only a satellite call having good positioning accuracy based on RF characteristic data received from the mobile communication terminal by the SUPL positioning center for each LBS call positioning and then creating the log file from the selected satellite call, when commercially available satellite positioning data is used.

15. The method as claimed in claim 12, wherein the measurement data is basically collected by the mobile communication terminal to use the LBS and comprises, as information regarding a system currently providing a service, an MCC (Mobile Country Code) of a GSM service region, an MNC (Mobile Network Code) for recognizing a business provider in a GSM network service region, an LAC (Location Area Code) as a code indicating coverage of a GSM base station, CI (Cell Identity) as only information used to identify base station information, a BSIC (Base station Identity Code) as an ID of an adjacent base station, an ARFCN (Absolute Radio Frequency Channel Number) as an RF channel identification number of GSM, a TA (Timing Advance) meaning a round trip delay measured from a base station to the mobile communication terminal, an RSSI (Received Signal Strength Indicator) corresponding to intensity of all signals received by the base station currently used by the mobile communication terminal, an RXLEV indicating intensity of signals received by the mobile communication terminal, an RXQUAL parameter indicating degree of the received signal intensity, an OTD value of each adjacent base station as a difference in received signals between the base station currently used by the mobile communication terminal and an adjacent base station, and an RXLEV value as a parameter indicating signal intensity of each adjacent base station.

16. A method for updating a G-pCell database for providing a mobile communication terminal with network-based location measurement, the method comprising the steps of:
(a) receiving a log file from an SUPL (Secure User Plane Location) positioning center by a network positioning server;
(b) parsing the log file to create separate data and searching for a G-pCell ID matching with the created separate data;
(c) confirming whether or not an MCC (Mobile Country Code), an MNC (Mobile network code), an LAC (Location Area Code), and a CI (Cell Identity) stored in a database table of each G-pCell ID with an MCC, an MNC, an LAC, and a CI contained in the separate data;
(d) comparing a CI, the CI being an ID of a base station currently used by the mobile communication terminal, and a BSIC of an adjacent base station collected by the mobile communication terminal with every CI and every BSIC stored in a database table of a corresponding G-pCell ID when it has been confirmed in step (c) that the MCC, MNC, LAC, and CI stored in the database table of the G-pCell are identical to the MCC, MNC, LAC, and CI contained in the separate data, calculating an average of OTD and signal intensity values of the separate data with regard to matching CI and BSIC, and updating the database table of an existing G-pCell ID; and
(e) adding a BSIC missing from a database table of the corresponding G-pCell ID to the database table of the G-pCell ID when it has been confirmed in step (c) that the MCC, MNC, LAC, and CI stored in the database table of the G-pCell ID are identical to the MCC, MNC, LAC, and CI contained in the separate data but the BSIC missing from a BSIC list of the database table of the corresponding G-pCell ID exists only in the separate data, storing OTD and signal intensity regarding the added BSIC, and updating the database table.

17. The method as claimed in claim 16, wherein a result of manual A-GPS positioning is used to update the G-pCell database in a region having no available A-GPS service.

18. The method as claimed in claim 16, further comprising, after step (c), a step of:
(c1) storing the separate data as a separate group in the database table of the corresponding G-pCell ID by the network positioning server when it has been confirmed in step (c) that at least one of the MCC, MNC, LAC, and CI stored in the database table of the G-pCell ID does not match with the corresponding MCC, MNC, LAC, and CI contained in the separate data parsed from the log file.

19. The method as claimed in claim 16, wherein, in step (d), when a plurality of OTD and signal intensity values exist with regard to matching BSIC in the database table of the G-pCell ID, an average of all OTD and signal intensity values is obtained and separately stored in the database table of the G-pCell when the OTD or signal intensity values are less than a predetermined number, and, when the OTD or signal intensity values are equal to or larger than the predetermined number, values lying out of a predetermined range are excluded, and an average of remaining values is obtained and separately stored in the database table of the G-pCell ID.

20. A method for reflecting base station change information in a G-pCell database for providing a mobile communication terminal with network-based location measurement, the method comprising the steps of:
(a) receiving base station change information created in a mobile communication network from a central management system by a network positioning server;
(b) searching through the base station change information to confirm whether or not the base station change information is base station deletion information;
(c) searching for all G-pCell IDs constructed in the G-pCell database with reference to a corresponding base station and deleting all information constructed with reference to the corresponding base station from group information stored in the
G-pCell IDs when it has been confirmed in step (b) that the base station change information is base station deletion information;
(d) confirming whether or not the base station change information is base station addition information when it has been confirmed in step (b) that the base station change information is not base station deletion information; and
(e) requesting that an SUPL (Secure User Plane Location) positioning center provides a log file regarding a result of A-GPS positioning for a period of time set by an administrator or for a period of time after a point of time set by the administrator with regard to an added base station and constructing a database table of G-pCell IDs when it has been confirmed in step (d) that the base station change information is base station addition information.

21. The method as claimed in claim 20, further comprising, after step (d), steps of:
(d1) confirming whether or not the base station change information is base station replacement information when it has been confirmed in step (d) that the base station change information is not base station addition information; and
(d2) conducting steps (c) and (e) successively with regard to a corresponding base station when it has been confirmed in step (d1) that the base station change information is base station replacement information.

22. A system for providing a mobile communication terminal with network-based location measurement by using a G-pCell database, the system comprising:
an SUPL positioning center acting as a network element for providing an A-GPS (Assisted GPS) service in a user plane type defined by SUPL (Secure User Plane Location) standards corresponding to OMA (Open Mobile Alliance) standards, the SUPL positioning center simultaneously providing a network-based solution service by using an A-GPS fallback solution even in an indoor region, an underground region, or other non-open regions having no available A-GPS service, the SUPL positioning center creating a separate log file for each A-GPS positioning from measurement data collected by the mobile communication terminal for network-type location measurement;
a network positioning server for storing the G-pCell database, requesting data necessary for positioning by using a protocol defined separately from SUPL POS data in case of interworking with the SUPL positioning center, parsing the log file when the log file is received from the SUPL positioning center to extract measurement data transmitted to the SUPL positioning center by the mobile communication terminal, and searching through the G-pCell database based on the measurement data to select a G-pCell ID having best pattern matching from G-pCell IDs;

a base station controller for controlling each base station arranged cell by cell and adapted to receive a location measurement request signal transmitted by the mobile communication terminal via a traffic channel among signal channels, the base station controller receiving the location measurement request signal from the base station;

an SGSN (Serving GPRS Support Node) having a hardware structure adapted to provide ATM-based switch and routing access for a GPRS (General Packet Radio Service), the SGSN supporting an OS (Operating System) for various data service processing, the SGSN receiving the location measurement request signal from the base station controller; and a GGSN (Gateway GPRS Support Node) acting as a serving node in an IP-based packet network providing a high-speed packet data service for a data service, the GGSN transmitting the location measurement request signal to the SUPL positioning center via a WAP gateway when the location measurement request signal is received from the SGSN.

23. The system as claimed in claim 22, wherein the mobile communication terminal is adapted to add the measurement data to the location measurement request signal and transmit the location measurement request signal to the SUPL positioning center, and, when the SUPL positioning center does not interwork, mobile communication terminal transmits the measurement data to the network positioning server.

24. The system as claimed in claim 22, wherein the SUPL positioning center is adapted to interwork by using an IS-801 protocol when the mobile communication terminal is based on CDMA (Code Division Multiple Access), by using an RRC protocol when the mobile communication terminal is based on W-CDMA, and by using an RRLP protocol when the mobile communication terminal is based on GSM (Global System for Mobile communication) so as to request that the mobile communication terminal collects the measurement data for constructing the G-pCell database.

25. The system as claimed in claim 24, wherein an execution mode of the protocol is a TCP/IP mode so that the mobile communication terminal interworks with the SUPL positioning center or the network positioning server in a TCP/IP type via the base station, the base station controller, the SGSN, and the GGSN.

26. The system as claimed in claim 22, further comprising an SUPL location center as a server for processing result data transmitted by the SUPL positioning center and the network positioning server as a location measurement result, the SUPL location center interworking with a data network via the WAP gateway to transmit the location measurement result to the mobile communication terminal in an HTTP type.

27. The system as claimed in claim 22, further comprising a central management system for collecting and managing information regarding change of all base stations existing in the system, the central management system transmitting base station change information to the network positioning server when a base station in the system changes.

28. The system as claimed in claim 27, wherein the network positioning server is adapted to search through the base station change information received from the central management system; when the base station change information is base station deletion information, the network positioning server searches for all G-pCell IDs constructed in the G-pCell database with reference to a corresponding base station and deletes all information constructed with reference to the corresponding base station from group information stored in the G-pCell IDs; when the base station change information is base station addition information, the network positioning server requests that the SUPL positioning center provides a log file regarding a result of A-GPS positioning for a period of time set by an administrator or for a period of time after a point of time set by the administrator and constructs a database table of G-pCell IDs; and, when the base station change information is base station replacement information, the network positioning server searches for all G-pCell IDs constructed in the G-pCell database with reference to a corresponding base station, deletes all information constructed with reference to the corresponding base station from group information stored in the G-pCell IDs, requests that the SUPL positioning center provides a log file regarding a result of A-GPS positioning for a period of time set by the administrator or for a period of time after a point of time set by the administrator, and constructs a database table of G-pCell IDs.

* * * * *